(12) United States Patent
Fruhmann et al.

(10) Patent No.: US 7,672,049 B2
(45) Date of Patent: Mar. 2, 2010

(54) TELESCOPE AND PANFOCAL TELESCOPE COMPRISING PLANOCONVEX OF PLANOCONCAVE LENS AND DEFLECTING MEANS CONNECTED THERETO

(75) Inventors: Andreas Fruhmann, Dornbirn (AT); Thomas Pozivil, Au (CH); Jürg Hinderling, Marbach (CH)

(73) Assignee: Leica Geosystems AG, Heerbrugg (CH)

( * ) Notice: Subject to any disclaimer, the term of this patent is extended or adjusted under 35 U.S.C. 154(b) by 101 days.

(21) Appl. No.: 11/720,188

(22) PCT Filed: Nov. 28, 2005

(86) PCT No.: PCT/EP2005/012694

§ 371 (c)(1),
(2), (4) Date: Jul. 10, 2007

(87) PCT Pub. No.: WO2006/056475

PCT Pub. Date: Jun. 1, 2006

(65) Prior Publication Data

US 2008/0259449 A1    Oct. 23, 2008

(30) Foreign Application Priority Data

Nov. 27, 2004  (EP)  ................................. 04028208

(51) Int. Cl.
*G02B 23/04*    (2006.01)

(52) U.S. Cl. ..................................................... 359/399
(58) Field of Classification Search ................... 359/399
See application file for complete search history.

(56) References Cited

U.S. PATENT DOCUMENTS

| | | | | |
|---|---|---|---|---|
| 4,165,936 A | * | 8/1979 | Eisenring et al. | 356/4.01 |
| 4,479,695 A | * | 10/1984 | Neil | 359/354 |
| 6,504,602 B1 | * | 1/2003 | Hinderling | 356/5.1 |
| 6,545,749 B1 | | 4/2003 | Andersson | |

FOREIGN PATENT DOCUMENTS

| | | | |
|---|---|---|---|
| EP | 1 081 459 | | 3/2001 |
| JP | 04 319687 | | 3/1993 |
| WO | WO04/001333 | * | 12/2003 |

* cited by examiner

*Primary Examiner*—Joshua L Pritchett
(74) *Attorney, Agent, or Firm*—Workman Nydegger

(57) ABSTRACT

The invention relates to a telescope which is used to inject and/or to extract, by reflection, emitting and/or capturing bundles of beams. According to the invention, at least one deflecting means is joined to the planar surface by means of at least one lens of the telescope objective unit, which is embodied as a plan convex or plan concave lens. The lens is used as a lens of the objective unit and as a holder for the deflection means. The number of optical components in the telescope about one of the holders is reduced due to the dual function thereof.

19 Claims, 3 Drawing Sheets

Figure 1:
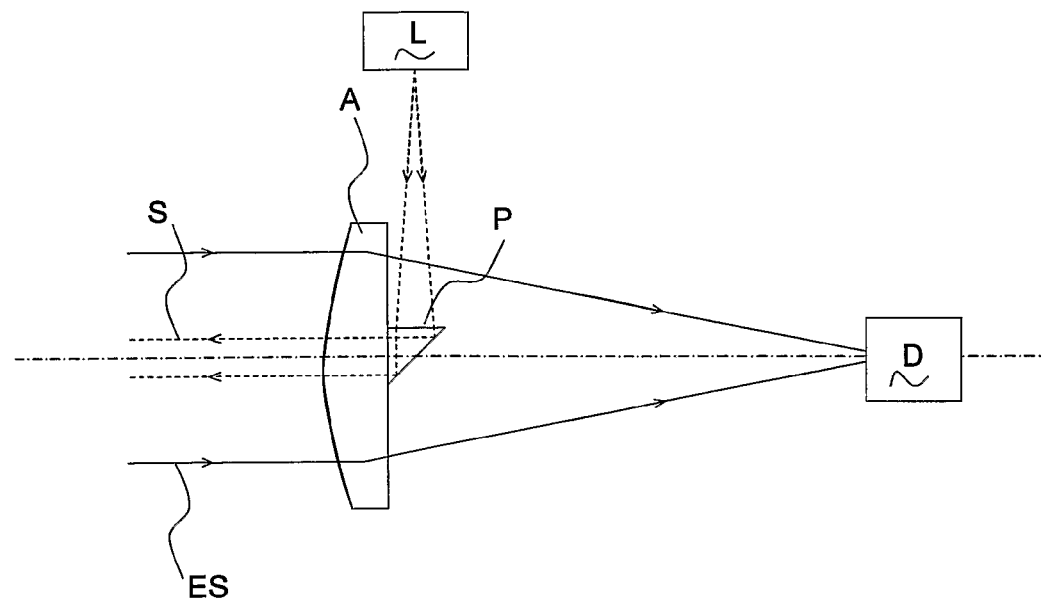

TELESCOPE AND PANFOCAL TELESCOPE COMPRISING PLANOCONVEX OF PLANOCONCAVE LENS AND DEFLECTING MEANS CONNECTED THERETO

The invention relates to a telescope according to the preamble of claim 1 and a panfocal telescope according to the preamble of claim 2.

The optical structure of telescopes is determined in particular by the function of the telescope, for example with regard to luminous intensity, imaging quality and focusing and magnification mechanisms. In contrast to optical measuring devices, such as, for example, an electrooptical range finder comprising an optical receiver for receiving bundles of rays, the bundles of rays in the telescope are received by the human eye, for which purpose an image of correspondingly very high quality is required. The challenge for optics engineers is the production of telescopes having a short length and nevertheless generically high imaging quality. For achieving this imaging quality, the correction of imaging errors, such as spherical aberration, coma, distortion and chromatic aberration, is required. These corrections are carried out by means of optical components, parameters such as the curvature of lenses, the number, the material—the optical properties—and the arrangement of the components for correction and the highly precise manufacture thereof and exact orientation in the telescope contributing to the image quality.

Measuring and/or recording devices are often integrated into telescopes, for example for geodetic, construction and military applications, measuring beams of the measuring devices being coupled into the beam path of the telescope and/or coupled out. For example, measuring beams for distance measurement and observation or for observation and image recording by means of a camera are coupled in and coupled out. The coupling in and coupling out are effected in general via a procedure in which measuring beams as transmitted beams are coupled into the optical beam path of the telescope via an optical assembly or an optical component and are directed toward a target via the telescope objective and measuring beams reflected and/or scattered by the target, as received beams, are collected via the telescope objective and in turn coupled out of the beam path of the telescope by means of an optical element to a receiver of the measuring device. It is of course also possible only to couple in beams—for example for a laser transmitter for homing—or only to couple out beams, for example for camera recordings. The incoupling and/or outcoupling element is generally chosen so that the shading of the telescope objective by the element is kept as small as possible. Below, "non-measuring" devices, such as image-recording devices, are also referred to as measuring device. The term "measuring beams" is used for beams which are reflected in and/or are reflected out by means of an optical assembly of an optical instrument. This also comprises beams which are reflected in and/or reflected out in a device but are not used for measuring, such as beams for observation in the telescope or for the image recording by means of a camera.

In order to achieve a high accuracy of measurement, the measuring beams are coupled in in the region of the optical axis of the measuring device. The coupling in and coupling out of the measuring beams are generally effected via assemblies which are composed of a lens, an incoupling and outcoupling element and a holder via which the incoupling and/or outcoupling element is introduced into the beam path. DE 196 15 601 discloses a coaxial distance-measuring device in which light for a distance measurement is coupled via an objective lens and an optical incoupling apparatus into the optical axis of a telescope and is coupled out of the optical axis of the telescope via the same lens and an optical outcoupling apparatus. For introducing an incoupling and outcoupling apparatus into the optical beam path of the telescope, a disk-like transparent prism-holding plate is provided as a holder. This additional holding plate necessitates both a greater length of the measuring device and reflection losses. Furthermore, it is generally difficult to achieve a completely precise and stable orientation of the holder in the optical beam path of the telescope. Inaccuracies in this context constitute further sources of error in a measurement. In addition, telescopes and range finders are preferably used in the open air and should therefore be as insensitive as possible to temperature changes and mechanical influences, such as shock and vibration. Each individual component in the measuring device reacts to temperature changes, i.e. each individual component constitutes a possible source of error and hence limitation of the accuracy of measurement, in particular of the directional stability of the optical sighting axis. It is therefore desirable, inter alia also for cost reasons, to keep the number of components in the measuring device as small as possible. The smaller the number of components, the more robust is the apparatus with respect to disturbing environmental influences.

In a telescope disclosed in U.S. Pat. No. 6,441,887, the coupling in and coupling out of measuring beams is effected via a prism unit. This comprises a plurality of prisms having optical coatings and is therefore extremely complex in design and requires very high accuracy in production. Moreover, this technical solution has the disadvantage of troublesome scattered light between the beam paths involved.

In the coupling of measuring beams for distance measurement into and out of the optical axis of a telescope, a further optical element is required which, in the case in point, allows through a part of the radiation reflected and/or scattered by an object to be surveyed for observation in the telescope and deflects another part for the receiving device of the range finder. In the telescope described in DE 196 15 601, this division is effected via a dichroic mirror which is introduced as a further additional element into the beam path of the telescope.

In a tacheometer telescope disclosed in EP 1 081 459, the division is effected via a beam splitter prism having partly metallized surfaces. In addition to this beam splitter prism, an incoupling mirror for coupling in measuring beams in the tacheometer telescope must be fixed by means of a holder, with the result that once again inaccuracies already mentioned, such as beam instabilities, occur. With each additional element, the risk of influencing troublesome environmental effects increases, but also the disadvantage of reflection losses. A substantial disadvantage is the space required by each individual component and the greater construction length of the optical instrument induced thereby.

An object of the invention is to provide a telescope having the function for reflecting measuring beams in and/or out, in particular for an integrated range finder and/or for a camera having few optical components and having a compact, in particular short, construction length and economical design and high accuracy of measurement and robustness to environmental influences, such as temperature and vibration.

A further object is the provision of a telescope having the function of reflecting measuring beams in and/or out and comprising few optical components and nevertheless having generically high imaging quality for the visual channel on the eyepiece side.

A further or alternative object of the invention is to provide a panfocal telescope having the function for reflecting measuring beams in and/or out, in particular for an integrated range finder and/or for a camera, the panfocal telescope having a compact, in particular short, construction length and economical design and high accuracy of measurement and robustness to environmental influences, such as temperature and vibration.

These objects are achieved, according to the invention, by, respectively, the subjects of claims 1 and 2 and the dependent claims or the solutions are further developed.

According to the invention, a telescope has an imaging objective unit comprising at least one lens in the form of a planoconvex or planoconcave lens. Thus, a contact surface for a component in the form of deflecting means is provided by means of the plane surface of the plane lens in the front region of the telescope. Because a lens of the objective unit performs the function of a holder for a deflecting means of the telescope, the number of components in the telescope can be reduced by one—the holder.

Figure 2:
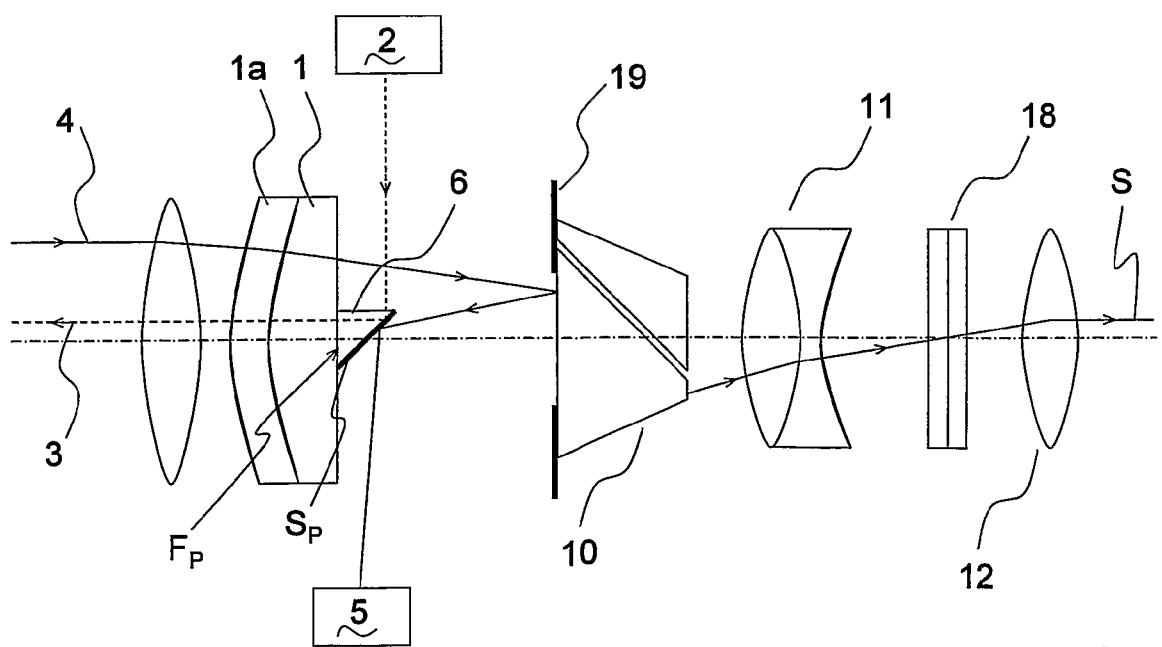

The plane surface of the lens of the objective unit is in particular the rearmost surface—for example this is the extreme right surface in FIG. 2, viewed from the objective opening—of the main objective of the telescope. The deflecting means preferably likewise has a plane surface, which plane surface is then connected to the objective plane surface. The deflecting means is formed for reflecting measuring beams in and/or out, for example for a range finder in the telescope.

The lens—in general the rearmost one, as shown, for example, in FIG. 2—of the objective unit is in the form of a planoconvex lens or of a planoconcave lens and is generally used as one of possibly a plurality of objective lenses—as likewise shown in FIG. 2. In order to produce an imaging objective having very good color correction as well as very small geometric imaging errors, such as spherical aberration, coma and distortion, in general all available optical degrees of freedom—these are area radii, thickness, distances and glass types—should be taken into account. With the condition of at least one plane surface on the rear objective lens, the number of degrees of freedom is now reduced by at least one, which makes it more difficult to produce images of generically high quality on the light channel on the eyepiece side.

A corresponding arrangement of a plane lens with a deflecting means is known per se. Thus, for example, U.S. Pat. No. 6,545,749 discloses a laser range finder comprising a planoconvex lens and a prism arranged on the plane surface thereof and intended for reflecting transmitted beams into the optical axis of the laser range finder. A laser range finder of the type of the range finder shown in U.S. Pat. No. 6,545,749 is represented in FIG. 1. The laser range finder has an optical system comprising a planoconvex lens A and a prism P, the prism P being arranged on the plane surface of the lens. Transmitted bundles of rays S emitted by a laser transmitting unit L are deflected by the prism P as a deflecting element via the planoconvex lens A in the direction of a target object. The bundles of rays reflected and/or scattered by the target object are collected as received bundles of rays ES by the planoconvex lens A and guided to a detector D. Because the required imaging quality of the optical components for a range finder—and generally for a sensory channel—is low compared with the required imaging quality for a telescope—and generally an imaging channel—the plane lens can be used here without problems. Owing to the plane surface of the lens, correspondingly large imaging errors occur so that the radius of the image circle—the radius of the scattering circle in the image plane due to imaging errors—is several times greater (e.g. 20 times) than is possible for an imaging system or telescope. The diameter of the image circle (light spot of the received bundle of rays in the image plane) may be, for example, more than 100 µm, whereas it is permitted to be only from 1 micron to a few microns in a telescope. However, because customary photodetectors have a sensitive range with diameters from 200 µm to 1000 µm, the total received radiation can be detected in spite of the enlarged image circle. Furthermore, since the imaging errors decrease to the power of three with a decrease in diameter of the respective transmitted or received bundle of rays, the beam-forming quality to the target object for the transmitted bundle of rays S, which has a generically small beam diameter in the region of the planoconvex lens A is likewise unproblematic.

In a telescope, on the other hand, a generically high imaging quality requires the production of a diffraction-limited image in the image plane of the telescope. In particular, the radius of the image circle in the image plane—that is the light spot of the received beam in the image plane, due to diffraction and imaging errors—can be determined only by diffraction and should be only a few microns. In order to achieve this, corrections for limiting the aberrations below a quarter of the wavelength of visible light are required. The total aberrations should therefore be less than $\lambda/4$, where $\lambda$ is the wavelength of visible light. The correction of the chromatic aberrations is always a challenge. The dependence of the refractive index of a medium on the wavelength is known to result in a shift in the image plane/"sharpness plane" for different wavelengths. It is known that chromatically error-free imaging can be realized simultaneously for two wavelengths using achromatic lenses. Images for the other wavelengths lie in front of or behind the sharpness plane, and this residual error is referred to as a secondary spectrum. For imaging systems, such as telescopes, there is the requirement for a sharp image as far as possible over is the total visual spectrum, i.e. the reduction or elimination of the secondary spectrum. Apochromatic lenses are known for this purpose, an objective being referred to in photography as apochromatically corrected if the color error (secondary spectrum) is less than 0.2% of the focal distance.

For precise calculation of the corresponding corrections, the properties of the optical components of the telescope must be taken into account. In addition to the refractive index n and the Abbe number v, the relative partial dispersion P is also important for visual systems. The relative partial dispersion describes the difference between Abbe numbers of two wavelengths. In the case in point, this is the relative partial dispersion $P_{g,F}$, based on the two wavelengths g=435.8 nm and F=486.1 nm. Normal glasses are characterized by a relative partial dispersion $P_{g,F}=a_{g,F}+b_{g,F}\cdot vd$, which relationship describes the so-called normal line. The constants $a_{g,F}$ and $b_{g,F}$ are usually set at $a_{g,F}=1.7241$ and $b_{g,F}=-0.008382$ and vd designates the Abbe number based on the wavelength d=587.6 nm. These relationships are represented and described, for example, in Naumann/Schröder: "Bauelemente der Optik" [Optical components], section 3.3.2 "Optische Gläser" [Optical glasses] (Carl Hanser Verlag, 6th edition).

A large number of special optical glasses are known for correcting imaging errors for visual systems. For color correction (reduction of the chromatic aberration) over a broad spectral range, i.e. for reducing or eliminating the secondary spectrum, special glasses having a relative partial dispersion which differs—possibly greatly—from the relative partial dispersion of the normal glasses are particularly suitable.

Since, in the case of the telescope according to the invention, at least one, in particular the rearmost lens of the objective unit has a plane surface (as shown, for example, in FIG. 2), the number of degrees of freedom is reduced by at least one, which makes it more difficult to produce images of a generically high quality on the light channel on the eyepiece side. In addition, no special glasses or as few special glasses as possible having pronounced anomalous partial dispersion should be used in the first—front—objective unit with a large opening. Although the optical correction at the same construction length and same focal distances is facilitated over the total focusing range of the telescope according to the invention by the special choice of glass types having pronounced anomalous partial dispersion, such special glasses have the disadvantages of high costs and poor processability. For example, such glasses are often softer than normal glasses and hence more susceptible to scratches and stria. Moreover, the resistance of special glasses to environmental influences, e.g. resistance to climatic conditions, spot resistance, acid resistance, is lower compared with normal glasses. Owing to the above disadvantages in comparison with normal glasses, special glasses are undesired in the—front—telescope objective, which has a generically large opening (and hence area of attack for such scratches, stria, etc.).

In order to use no special glasses or as few highly refractive or highly dispersive special glasses as possible in the objective region of the telescope, according to the invention a part of the optical correction is shifted to further optical telescope components, such as, for example, the focusing member. Normal glasses which can be easily processed and are economical are preferably chosen for the objective unit with generally large aperture. The subsequent optical correction, in particular the improvement of residual color errors in the context of apochromasia, is effected in the second optical member or in the movable focusing member. There, at least one of the glass types having a relative partial dispersion $P_{g,F}$ at the wavelengths g=435.8 nm and F=486.1 nm, which differs by at least 0.005 from that of the normal glasses, is chosen. The optical correction of the objective unit with the deflecting means, on the other hand, is designed via the full aperture in such a way that the point image of measuring beams received by means of the objective unit and deflected by the deflecting means to a receiving unit only just efficiently strikes the receiving unit, whereas the optical correction via the opening region of the outgoing transmitted beams is diffraction-limited.

The counterpart to the plane surface of the lens in the form of a planoconvex lens or in the form of a planoconcave lens forms the deflecting means. The deflecting means has a mirror surface for reflecting in and/or reflecting out bundles of measuring beams and may be, for example, in the form of a prism or cube having a mirror surface for reflecting in and/or reflecting out the bundles of rays. However, it is also possible to use, for example, two prisms. In principle, reflecting squares or one-piece mirrors with integrated holder for fixing are also suitable as means for deflection. A front surface mirror as a means for deflection has the advantage that the proportion of undesired scattered radiation from the transmitter into the receiver can be reduced.

There are a variety of possibilities for connecting lens and deflecting means. For example, the deflecting means can be adhesively bonded to the lens by means of an opaque, e.g. black, adhesive. It is also possible for lens and deflecting means to be cemented to one another by means of a cement transparent to the beam. Adhesive bonding therefore means in particular that the connection takes place outside the optical beam path, while cementing designates in particular a connection in the optical beam path—i.e. passage of the beam through the optically transparent cement. With a plane-plane connection between lens and deflecting means, a defined adhesive surface or a defined adhesive gap is provided, permitting a connection having a long life. A modern and in particular positionally stable variant is a plane-plane connection by diffusion welding. Lens and deflecting means could, however, also be produced as a one-component assembly. Preferably, both the lens and the deflecting means are produced from glass, optionally also with different optical characteristics, but other optical materials are also conceivable.

The deflecting means is fixed to the plane surface of the lens. The connection of the deflecting means to the plane surface of the lens can be effected to a plane surface of the deflecting means but may also be effected to a non-cohesive plane surface, for example, provided with depressions and grooves, in the extreme case with only point-like contact. The connection via two plane surfaces, that of the lens and that of the deflecting means, ensures high stability, such as conformity of the angles, and—as mentioned above—a constant cement or adhesive gap and hence a long adhesive bond life and robustness to the formation of bubbles, such as air bubbles, or Newtonian rings. The lens—deflecting means components connected to one another as described are understood as meaning "substantially one-piece". A separate mechanical component as a holder for the deflecting means, whether for pure positioning in the telescope or panfocal telescope or as a connecting holder for the lens, is omitted.

The deflecting means can, but need not, be arranged on the optical axis of the lens or of the telescope or of a measuring module, such as a range finder, integrated into the telescope. The positioning on or as close as possible to the optical axis of a measuring module is desired and advantageous precisely for distance measurement to non-cooperative targets. For measurements with reflected beams with high parallelism in the case of measurements to cooperative targets, the deflecting means should be positioned in a suitable manner so that the shading of the reflected and/or scattered measuring radiation due to the deflecting element—and of course the radiation/observation radiation for imaging in the visual channel—is kept as small as possible. For avoiding the above mentioned shading, it is also expedient to form the deflecting means as a very small and optionally asymmetric component. An example of this is disclosed in DE 196 15 601.

The deflecting means mounted on the plane surface of the plane lens of the telescope objective unit can be used, for example, for coupling in and/or coupling out measuring beams for a range finder in the telescope. Of course, measuring beams for, for example, an optical interferometer, a homing unit, a camera or another measurement can equally well be reflected in and reflected out via the plane lens/deflecting means assembly. It is also possible for measuring beams to be coupled only in to the optical axis of the telescope and to be projected via the telescope objective onto a target, for example for an illuminating device. Only reception of received beams by means of the objective unit and coupling out of the beams by means of the deflecting unit to a receiver are also possible, for example for a recording module. The lens having a plane surface is used in its function as a lens but simultaneously has the additional function of a holder for the deflecting means. Consequently, one component less is required in the telescope.

Particularly in the case of a range finder integrated in the telescope, the measuring beams are, for example, emitted as transmitted beams by a transmitter and, after reflection and/or scattering by a target object, are received as received beams by a receiver. The transmitter used is preferably a laser, and, depending on the intended use, the radiation may be divergent and/or diffraction-limited collimated, non-visible and/or visible radiation. Divergent radiation is preferably used for measurements to cooperative, i.e. self-illuminating or reflecting, targets and diffraction-limited collimated radiation for measurements to non-cooperative targets.

A further component in the telescope can be omitted if the image-erecting system is arranged between deflecting means and focusing lens. In addition to its function as an image inversion system—for the "observation radiation"—the image-erecting system can therefore be used for directing a part of the radiation reflected and/or scattered by the target object to a deflecting means. For this purpose, the image-erecting system is produced, for example, with a dichroic layer at which measuring beams are reflected and beams for observation are allowed through.

In a panfocal telescope, too, a lens of the objective unit can be formed, according to the invention, as a plane lens with the deflecting means for coupling in and coupling out measuring beams. A panfocal telescope is characterized by a field of view which is variable with the distance. On focusing, the focal distance changes considerably. In the panfocal telescope, measuring beams for, for example, range finders and/or cameras can be reflected in and/or reflected out by means of plane lens and deflecting means, as in the telescope. The integration of, for example, a range finder and/or a camera into a panfocal telescope is novel per se. Owing to the special function of the panfocal telescope—enormous increase in angle to large distances—the panfocal telescope is produced with a multiplicity of optical components which are required for achieving the "panfocal function" or for achieving diffraction-limited imaging. Of course, the diffraction-limited image relates to the image for observation in the visual channel on the eyepiece side. The production of the generically diffraction-limited image sets high requirements with regard to the optical components since the image is to be achieved for a large focal distance—e.g. 500 nm—of the telescope with nevertheless short construction length thereof. Of course, this multiplicity of optical components does—without increase in the construction length—complicate the integration of further elements. The integration of a range finder—or of a transmitting component for emitting radiation—is also problematic since, owing to the many optical components, coupling out of transmitted beams results in a high proportion of scattered light which impairs or prevents the imaging by the telescope. With the formation of the panfocal telescope according to the invention, the transmitted beams can be reflected out at the front unit of the telescope so that there is no impairment by scattered light. Furthermore, the utilization of optical components already present in the telescope permits the integration of transmitting and/or receiving components.

Figure 3:
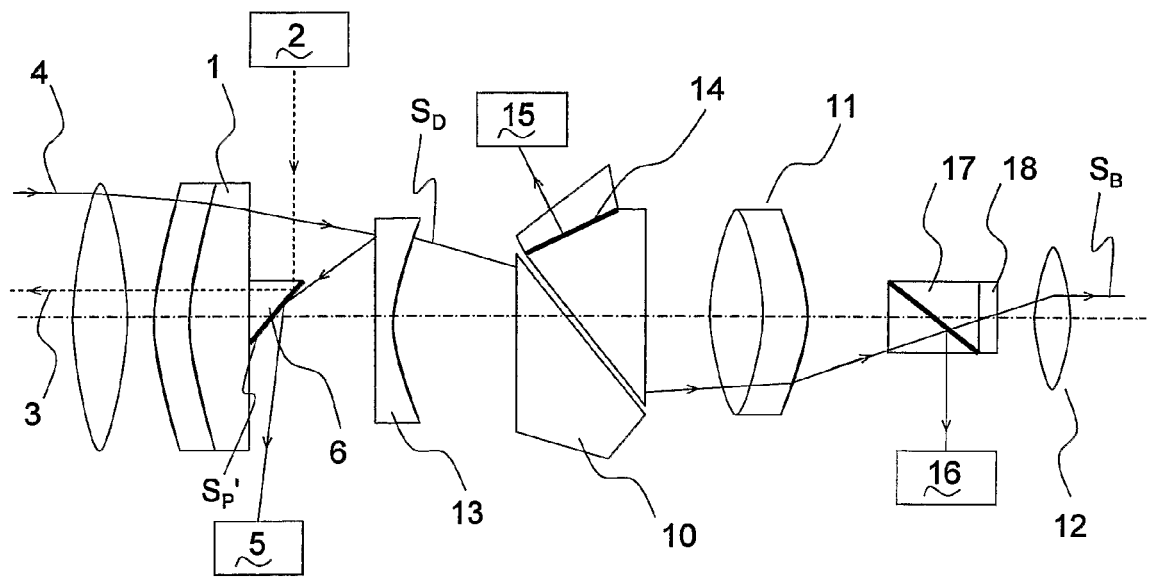
Figure 4:
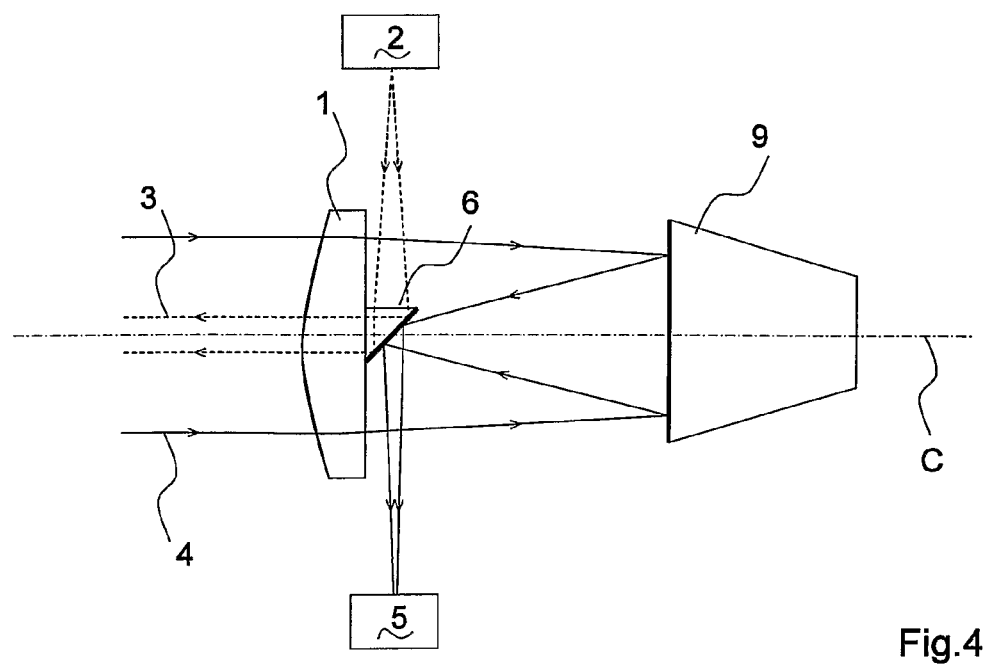
Figure 5:
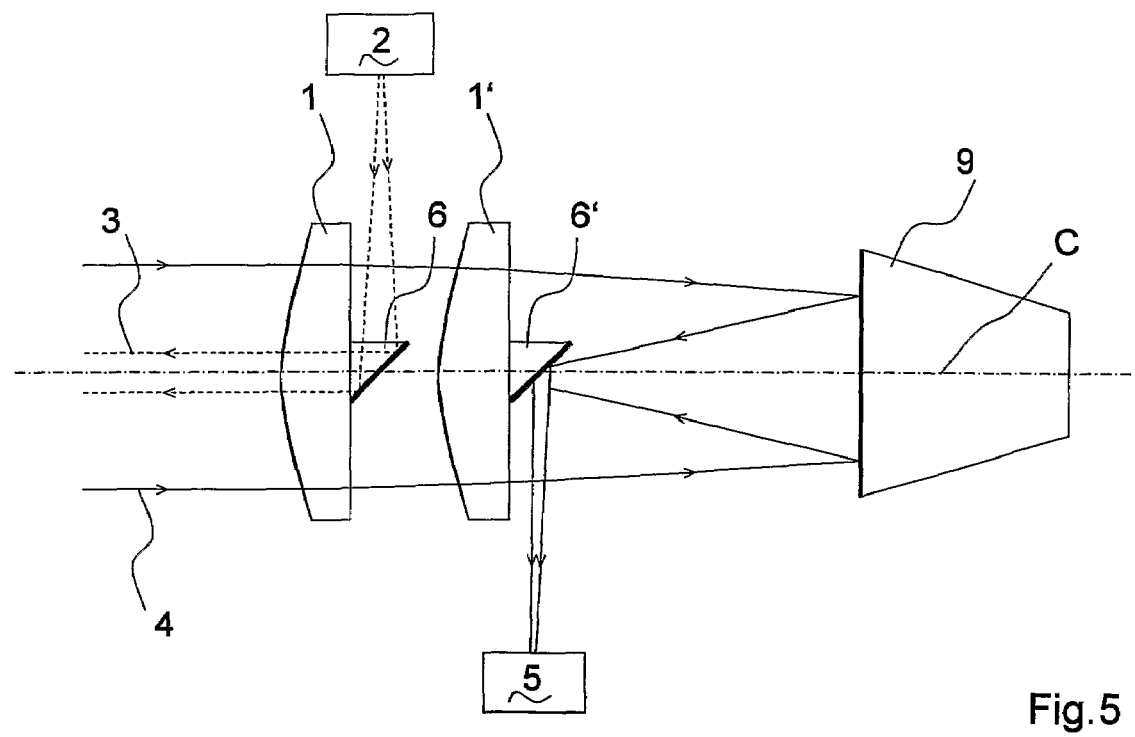
Figure 6:
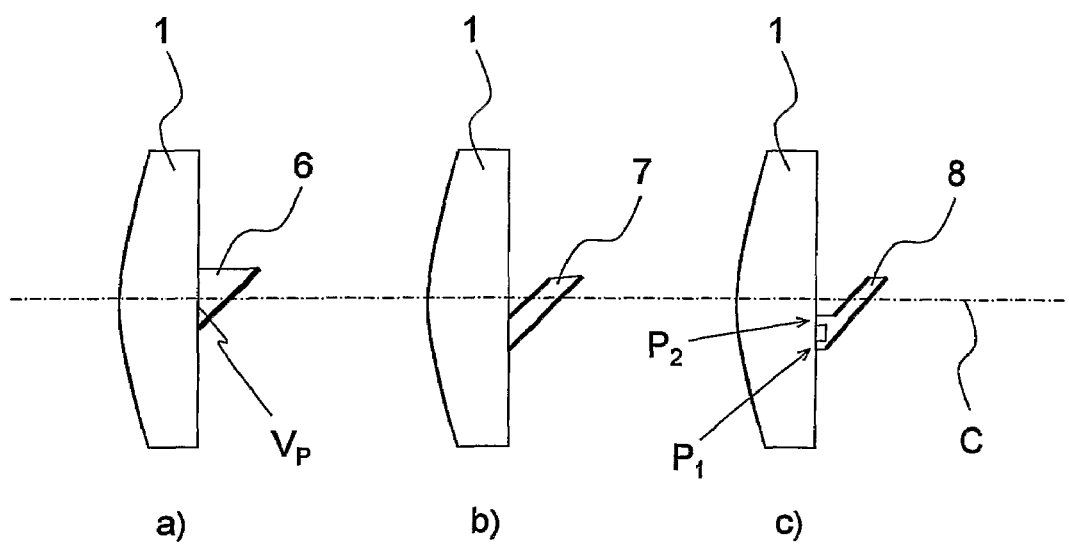

The telescope according to the invention and panfocal telescope according to the invention are described in more detail below, purely by way of example, with reference to specific working examples shown schematically in the drawings, further advantages of the invention also being discussed. Specifically:

FIG. 1 shows a range finder comprising a planoconvex lens and a deflecting prism according to the prior art, FIG. 2 schematically shows a telescope according to the invention, comprising a planoconvex lens and a deflecting means for reflecting measured beams into the optical beam path of the telescope and reflecting measured beams out of said beam path, FIG. 3 schematically shows a panfocal telescope comprising a planoconvex lens and a deflecting means for reflecting measured beams into the optical beam path of the panfocal telescope and reflecting measured beams out of said beam path, FIG. 4 schematically shows an embodiment of a range finder comprising a telescope according to the invention, FIG. 5 schematically shows a second embodiment of a range finder comprising a telescope according to the invention and FIG. 6 schematically shows, in three partial figures, three working examples of a lens of an objective unit of a telescope or panfocal telescope according to the invention, which lens is combined with a deflecting means.

FIG. 1 shows the—previously described—laser range finder as known from the prior art.

FIG. 2 shows a telescope according to the invention, a lens 1 of the objective unit of the telescope being in the form of a planoconvex lens. A plano-optical deflecting means shown as prism 6 and intended for reflecting measured beams, for example for a range finder, in to and out of the optical axis of the telescope in a compact, coaxial and stable manner is mounted on the plane surface of the lens 1. The prism 6 has a mirror surface $S_P$ which is reflective with respect to the wavelength of the measuring beams. The mounting or connection is such that the connected components, lens 1 and prism 6, constitute a substantially integral component. The connection of the prism 6 to the lens 1 is implemented as a cement joint—a cement transparent to light connects the plane surface $F_P$ of the prism 6 to the plane surface of the lens 1. A bundle of transmitted rays 3 which is emitted by a transmitting unit 2 is directed toward a target object by the deflecting means and the lens 1, which here is in the form of the rearmost lens of the objective unit and is optionally connected—e.g. cemented—to one or more lenses 1a. The bundle of rays which is reflected and/or scattered by the target object strikes the lens 1 as a bundle of received rays 4 and is guided to an image-erecting system 10. Here, the image-erecting or image inversion system 10 is in the form of a Pechan prism having a layer partly transparent to radiation, in particular a spectrally dichroic layer. The beams reflected and/or scattered by the target object, which are collected by means of the telescope objective unit, are reflected and/or scattered at the image-erecting system 10 to the deflecting means represented as prism 6. Beams S received by means of the telescope optical system and intended for observation in the visual channel/light channel in the eyepiece side are shown only in the beam path of the telescope after the image-erecting system for reasons of clarity. The beams S received by means of the objective unit, such as ambient light, for observation are transmitted by the image-erecting system 10 and reach the eyepiece 12. Because the image-erecting system 10 of the telescope is used as a mirror system for measuring beams, a dual function is assigned to a further component, which favors a short and compact construction length of the telescope.

Furthermore, a plane surface is provided for beam inversion. The beam inversion is also effected in the embodiment of FIG. 2 from glass into air. This is advantageous in that the beam incidence on a dichroic layer is unproblematic in the case of a plane surface, whereas undesired effects, such as polarization effects, occur in the case of incidence on an oblique surface—in particular in glass, e.g. a glass cube. For sighting a target object, a sighting axis mark 18 —or another mark structuring the field of view—can be introduced into the image plane of the visual telescope channel. The pupil 19 of the actual visual image can be positioned inside the telescope and reduced in size while the lens 1 with its full aperture collects the returning bundle of received rays 4 and passes it via image-erecting system 10 and prism 6 to the receiver 5. Lens 1, image-erecting system 10 and prism 6 in the telescope can of course also be used for coupling in and/or coupling out beams for a camera or another electrooptical device. By the use of the lens 1 having a plane surface, corrections of the imaging errors become very much more complicated in comparison with a customary telescope optical system. The imaging errors could, for example, be compensated with the use of special glasses in the objective unit. However, since special glasses are firstly expensive and secondly poorly processable and less resistant to external influences—and therefore rapidly have, for example, scratches and spots—the correction is shifted to other optical components of the telescope. Thus, in the working example, the focusing unit 11 comprises at least one lens which differs from normal glasses with respect to the relative partial dispersion in that a corresponding generic color correction—and also a correction of the geometric aberrations—is achieved in the telescope. The production of correspondingly sharp images for observation is therefore possible. For inadequate correction, it is necessary, for example, to achieve the image definition with a plurality of wavelengths, in particular over the total visual spectrum. The imaging errors should be corrected to such an extent that images in the image plane—in the working example, these are images on the sighting axis mark 18—are shown sharply enough for the eye of an observer. Sharply enough is defined as a point image whose diameter substantially corresponds to the diameter of a diffraction-limited point image. Of course, the diffraction-limited image relates to the image for observation through the visual telescope channel on the eyepiece side.

FIG. 3 shows a panfocal telescope according to the invention, comprising a plane lens and a plano-optical deflecting means corresponding to FIG. 2. A panfocal telescope is distinguished by a field of view which is variable with the distance. Close up, better object overview is obtained owing to the larger field of view, and at a distance good object resolution is retained owing to the increased angular magnification. The panfocal telescope comprises two front objective units, an image-erecting system 10, a focusing unit 11 and an eyepiece 12 and is designed so that a high visual angular magnification is achieved at great distances and a smaller angular magnification at small distances. In the panfocal telescope according to the invention which is shown, the rearmost lens of the first objective unit is in the form of a planoconvex lens and serves so to speak as a holder for a prism 6 as a deflecting means. The prism 6 is used for reflecting in and reflecting out a bundle 3, 4 of transmitted and received rays, for example for a range finder, the reflecting in and reflecting out being effected at a mirror layer $S_P$' of the prism 6. The prism 6 may also have two mirror layers. A lens 13 of the second objective unit serves as a mirror unit for bundles of received rays 4. For this purpose, the lens 13 is produced with a dichroic layer, at which dichroic layer beams of the wavelength of the bundle of received rays 4—e.g. laser beams—are reflected and/or scattered in the direction of the deflecting means and/or of the receiving unit 5 and beams having wavelengths differing from the wavelength of the bundle of received rays 4—e.g. ambient light and infrared radiation—are allowed through. The beams $S_D$ allowed through are firstly passed through the visual channel to the eyepiece, where they are finally available to an observer in a known manner as observation beams $S_B$. Secondly, beams $S_D$ which are allowed through are partly coupled out. For this purpose, the image-erecting system 10 is provided here with a second, in particular spectrally dichroic, layer 14 partly transparent to beams for coupling out further beams received by means of the objective unit—e.g. in the infrared range—for example for recording by means of a camera—in particular a fixed focus camera. The camera may be in the form of, for example, an infrared camera and may receive infrared radiation coupled out by the layer 14. Finally, a beam splitter 17 is also introduced into the optical beam path of the panfocal telescope between focusing unit 11 and eyepiece 12, by means of which beam splitter beams transmitted from the image-erecting system 10 and focused by the focusing unit 11 can be coupled out, for example for image detection via a second, in particular focusable, camera. Here, the beam splitter 17 is in the form of a splitter cube having a partly transparent, in particular spectrally dichroic, layer and, in addition to the function of refracting out beams, can be used for mounting a sighting axis mark 18 in the image plane of the visual panfocal telescope, for which purpose an additional element is otherwise generally required in the optical beam path of the panfocal telescope. In the development according to the invention, various additional measuring and/or recording elements can be integrated into the panfocal telescope. In addition a compact and economical design of the panfocal telescope is achieved firstly by the use of a lens 1 of the first objective unit as a holder for the deflecting means and secondly by the use of a lens 13 of the second objective unit as a mirror system. The correction of the imaging errors—which are even more complicated for a panfocal telescope owing to the variability of the field of view—is shifted into optical components outside the sensitive first objective unit, analogously to the telescope. Thus, for example, the second objective unit or elements of the second objective unit and/or the image-erecting system 10 and/or the focusing unit 11 are made of glass which has a relative partial dispersion which differs by at least 0.005 from the relative partial dispersion of the normal glasses.

FIG. 4 shows a section of a telescope or panfocal telescope according to the invention. The diagram relates to a range finder integrated in the telescope or panfocal telescope. A mirror system 9 is shown schematically as a trapezoidal body. For the telescope function, the mirror system 9 is transparent to beams for diffraction-limited imaging in the telescope. The beams for imaging are not shown in the working example. The optical axis C on which the optical elements are arranged centrally represents in particular the optical axis of the telescope. A bundle of transmitted rays 3 emanating from a transmitting unit 2 strikes a deflecting means—shown here as prism 6—and is deflected at a mirror surface of the deflecting means to the lens 1. The prism 6 has, as a mirror surface, a reflecting layer at which the bundles of rays are firstly deflected and secondly—for imaging by means of the objective unit—pass through. The bundle of transmitted rays 3 is directed by means of the planoconvex lens toward a target object which is not shown here. The target object may be cooperative—i.e. self-illuminating or a reflector—but may equally be non-cooperative, such as, for example, a natural rough surface. The bundle of transmitted rays 3 is reflected and/or scattered by the target object. The reflected and/or scattered part of the bundle of transmitted rays 3—designated as bundle of received rays 4—which strikes the lens 1 again is deflected by means of the lens 1 to the mirror system 9. The mirror system 9, which may also be used, for example, for image inversion, is shown here as a trapezoidal glass body having a dichroic layer. The mirror system 9 can of course also have another shape; it may also be formed from another optical material. It can equally be formed from more than only one piece, for example as an Abbe/König prism. By means of the mirror system 9, the bundle of received rays 4 is directed to the deflecting means in the form of prism 6 and deflected by means of the deflecting means to a receiving unit 5. Of course, the deflecting means need not necessarily be used for coupling in and coupling out measuring beams; it is equally possible to use the deflecting means only for coupling in or only for coupling out the beams. The deflecting means shown here as prism 6 is arranged here on the optical axis C of the lens 1 or of the range finder and in particular of the telescope. The arrangement whereby the optical axis of the deflecting means coincides with the optical axis C of the lens 1 and/or of the measuring instrument in which the optical assembly is installed is advantageous for many applications, such as, for example, distance measurement in the telescope, e.g. a sighting telescope. The deflecting means is formed as small as possible in order firstly to keep the shading of the bundle of received rays 4 due to the deflecting means—in particular at short distances to the target object—as small as possible and secondly to reduce the diffraction blur in the image plane, produced by the central pupil vignetting.

FIG. 5 shows a further possible embodiment of a first objective unit comprising two plane lenses and two deflecting means for a telescope or panfocal telescope according to the invention. In particular, such an embodiment is suitable for avoiding disturbance of the receiving unit 5 by the bundle of transmitted rays 3. Two lenses 1, 1' of the objective unit are connected to in each case a deflecting means in the form of prism 6, 6' for coupling in and coupling out bundles of transmitted and received rays 3, 4. The connection is effected in each case to the plane surface of the lens 1, 1' and a plane surface of the prism 6, 6'. A mirror system 9—also useable as an image-erecting system—having a layer reflective for the wavelength range of the bundle of received rays 4 and transparent to bundles of rays of other wavelength ranges is arranged, for beam inversion, on the optical axis C of the arrangement. Analogously to FIG. 4, a bundle of transmitted rays 3 from a transmitting unit 2 is guided by means of the first prism 6 and the first lens 1 in the direction of a target object which is not shown, is reflected and/or scattered by the target object and is directed as a bundle of received rays 4 by means of a first lens 1 and a second lens 1', which is arranged to the right of the first lens 1 in the figure, to the mirror system 9. The bundle of received rays 4 is reflected back and/or scattered by the layer of the mirror system 9 and strikes the prism 6' connected to the second lens 1', by means of which prism it is guided to a receiving unit 5. This formation comprising two plane lenses with deflecting means permits very good separation between the bundle of transmitted rays 3 and the bundle of received rays 4 and constitutes a possibility for reducing the undesired, troublesome, measurement-falsifying scattered radiation of the bundle of transmitted rays 3 to the receiving unit 5. This embodiment comprising two lenses 1, 1' and two deflecting means can be used, for example, for a range finder with high signal sensitivity but is of course not limited to a range finder but can also be used for other optical, for example, angle-measuring, measuring instruments in a telescope or panfocal telescope.

FIG. 6 shows, in three partial FIGS. 6a, 6b, 6c three possible working examples for the combination of a lens 1 of a telescope objective with a deflecting means. The lens 1 is always shown in the partial figures as a planoconvex lens but may be in the form of both a planoconvex lens and a planoconcave lens.

FIG. 6a shows the lens 1 with a deflecting means in the form of prism 6 with metallization of the back surface. Prism 6 and lens 1 are connected by means of a cement as a joining means, a plane surface $V_P$ of the prism 6 being connected to the plane surface of the lens 1. The cement as joining means allows through bundles of rays substantially undisturbed. For the connection of lens 1 and prism, no intermediate mechanical components are therefore required, so that lens 1 and prism 6 represent a substantially integral component.

In FIG. 6b, a front surface mirror 7 as a deflecting means is combined with the lens 1. In this embodiment with connection only over a small area, the advantage of connection via plane surfaces is particularly pronounced. Because the connection is planar on both sides, the thickness of the adhesive gap thereof is process-controlled and consequently joining force, angular stability and life of the connection with regard to adhesion and transmittance are ensured.

FIG. 6c shows the lens 1 and a possible formation of the deflecting means as a mirror fixed with integrated holder to the lens 1—referred to as retaining mirror 8 in the context of the invention. The retaining mirror 8 is fixed to the lens 1 by means of an adhesive transparent to light. Since the adhesive bond is effected in substantially point-like manner at two connecting points $P_1$, $P_2$ the radiation passing through the retaining mirror 7 and the lens 1 is only slightly shaded. The deflecting means could also be a reflecting element fixed as an integral component by means of the holder to the lens 1 or may be a reflecting square.

What is claimed is:

1. A telescope for diffraction-limited imaging, comprising:
   an objective unit including a planoconvex or planoconcave lens having a flat plano side;
   a transmitting unit for transmitting a bundle of rays as bundle of transmitted rays; and/or
   a receiving unit for receiving a bundle of rays as bundle of received rays;
   at least one deflecting means having at least one mirror surface for reflecting the bundle of transmitted rays into the optical beam path of the telescope and/or reflecting the bundle of received rays out of the optical beam path of the telescope, wherein the at least one deflecting means is arranged on the flat plane surface of the planoconvex or planoconcave lens, the lens and deflecting means being connected to one another such that a flat surface of the deflecting means lies against the flat plano side of the planoconvex or planoconcave lens such that they constitute a substantially integral component;
   an image-erecting system;
   a focusing unit; and
   an eyepiece.

2. The telescope as claimed in claim 1, wherein the at least one deflecting means is in the form of one of the following alternatives:
   prism,
   front surface mirror,
   retaining mirror,
   reflecting square.

3. The telescope as claimed in claim 1, wherein a connection between deflecting means and planoconvex or planoconcave lens is produced by means of one of the following techniques:
   adhesive bonding,
   cementing,
   diffusion welding.

4. The telescope as claimed in claim 1, comprising a mirror system arranged between deflecting means and eyepiece and intended for directing the bundle of received rays to the deflecting means and/or to the receiving unit.

5. The telescope as claimed in claim 1, wherein two lenses, in the form of planoconvex and/or planoconcave lenses, having in each case a deflecting means are coordinated with the objective unit.

6. The telescope as claimed in claim 1, wherein the image-erecting system is positioned between deflecting means and focusing unit and is in the form of a mirror system for directing the bundle of received rays to the deflecting means and/or to the receiving unit.

7. The telescope of claim 1, wherein the at least one deflecting means includes at least one plano-optical deflecting means, the telescope further comprising a sighting axis mark.

8. The telescope of claim 1, wherein at least one element of the image-erecting system and/or the focusing unit is formed from glass having a relative partial dispersion $P_{g,F}$ which differs by at least 0.005 from that of normal glasses in order to shift at least a part of the optical correction from the planoconvex or planoconcave lens to the image-erecting system respectively the focusing unit.

9. A panfocal telescope for diffraction-limited imaging, comprising:
   a first objective unit having at least one lens;
   a second objective unit having at least one lens, wherein the at least one lens of the first and/or second objective unit includes a planoconvex or planoconcave lens;
   an image-erecting system;
   a focusing unit;
   an eyepiece;
   a transmitting unit for transmitting a bundle of rays as a bundle of transmitted rays; and/or
   a receiving unit for the receiving of a bundle of rays as a bundle of received rays; and
   at least one deflecting means having at least one mirror surface for reflecting the bundle of received rays into the optical beam path of the panfocal telescope and/or reflecting the bundle of received rays out of the optical beam path of the panfocal telescope, the at least one deflecting means having a flat surface that is arranged against the flat plane surface of the planoconvex or planoconcave lens such that the flat surface of the at least one deflecting means is flush against the flat plane surface of the planoconvex or planoconcave lens, the flat surfaces of the lens and deflecting means being connected to one another so that they constitute a substantially integral component.

10. The panfocal telescope as claimed in claim 9, wherein two lenses, in the form of planoconvex and/or planoconcave lenses, having in each case a deflecting means are coordinated with the first objective unit.

11. The panfocal telescope as claimed in claim 9, wherein the second objective unit is positioned between deflecting means and image-erecting system and a lens of the second objective unit is in the form of a mirror system for directing the bundle of received rays to the deflecting means and/or to the receiving unit.

12. The panfocal telescope as claimed in claim 9, wherein the image-erecting system is formed with at least one partly transparent layer, via which partly transparent layer beams are coupled out of the beam path of the panfocal telescope to at least one second receiving unit, in particular a camera.

13. The panfocal telescope as claimed in claim 9, wherein a further beam splitter between the focusing unit and the eyepiece and at least one third receiving unit, in particular a camera, are provided, via which beam splitter beams are deflected out of the beam path of the panfocal telescope to the third receiving unit.

14. The panfocal telescope as claimed in claim 13, wherein a sighting axis mark is arranged on the further beam splitter.

15. The panfocal telescope as claimed in claim 9, wherein the at least one deflecting means is in the form of one of the following alternatives:
   prism,
   front surface mirror,
   retaining mirror,
   reflecting square.

16. The panfocal telescope as claimed in claim 9, wherein a connection between deflecting means and planoconvex or planoconcave lens is produced by means of one of the following techniques:
   adhesive bonding,
   cementing,
   diffusion welding.

17. The panfocal telescope as claimed in claim 9, comprising a mirror system arranged between deflecting means and eyepiece and intended for directing the bundle of received rays to the deflecting means and/or to the receiving unit.

18. The panfocal telescope of claim 9, wherein the at least one deflecting means includes at least one plano-optical deflecting means.

19. The panfocal telescope of claim 9, wherein at least one element of the second objective unit, the image-erecting system and/or the focusing unit is formed from glass having a relative partial dispersion $P_{g,F}$ which differs by at least 0.005 from that of normal glasses in order to shift at least a part of the optical correction from the planoconvex or planoconcave lens to the second objective unit, the image-erecting system or the focusing unit, respectively.

* * * * *